April 27, 1954

H. KONET 2,677,120

DIRECTIONAL GYROSCOPE INDICATOR

Filed Dec. 4, 1951

INVENTOR.
HENRY KONET
BY
[signature]
ATTORNEY

April 27, 1954  H. KONET  2,677,120
DIRECTIONAL GYROSCOPE INDICATOR
Filed Dec. 4, 1951  3 Sheets-Sheet 2

INVENTOR.
HENRY KONET
BY
- ATTORNEY -

April 27, 1954 — H. KONET — 2,677,120
DIRECTIONAL GYROSCOPE INDICATOR
Filed Dec. 4, 1951 — 3 Sheets-Sheet 3

INVENTOR.
HENRY KONET
BY
ATTORNEY

Patented Apr. 27, 1954

2,677,120

UNITED STATES PATENT OFFICE 2,677,120

DIRECTIONAL GYROSCOPE INDICATOR

Henry Konet, Hohokus, N. J., assignor to Bendix Aviation Corporation, Teterboro, N. J., a corporation of Delaware Application December 4, 1951, Serial No. 259,832

3 Claims. (Cl. 340—27)

The invention relates generally to gyroscope instruments and more particularly to directional gyroscope indicators adapted for use on moving craft, such as aircraft and marine vessels.

One object of the present invention is to provide a directional gyroscope indicator having novel structure for drivably connecting a pointer to the gyroscope for movement relative to a dial, and whereby the pointer alone, or the pointer and dial together may be adjusted without disturbing the gyroscope.

The invention contemplates a directional gyroscope indicator having a pointer movable relative to a dial and drivably connected to a gyroscope by a magnetic clutch. Means is provided for disengaging the pointer from its driving engagement with the gyroscope and for adjusting the pointer alone or the pointer and dial together without disturbing the gyroscope.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only and are not intended as a definition of the limits of the invention.

Figure 2:
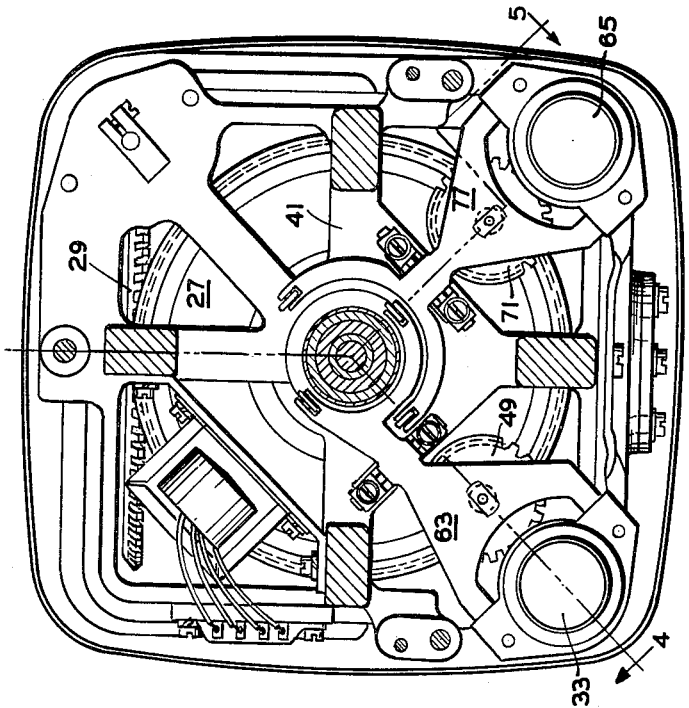
Figure 2 is a transverse vertical section taken approximately on the line 2—2 of Figure 1 and drawn to smaller scale.
Figure 5:
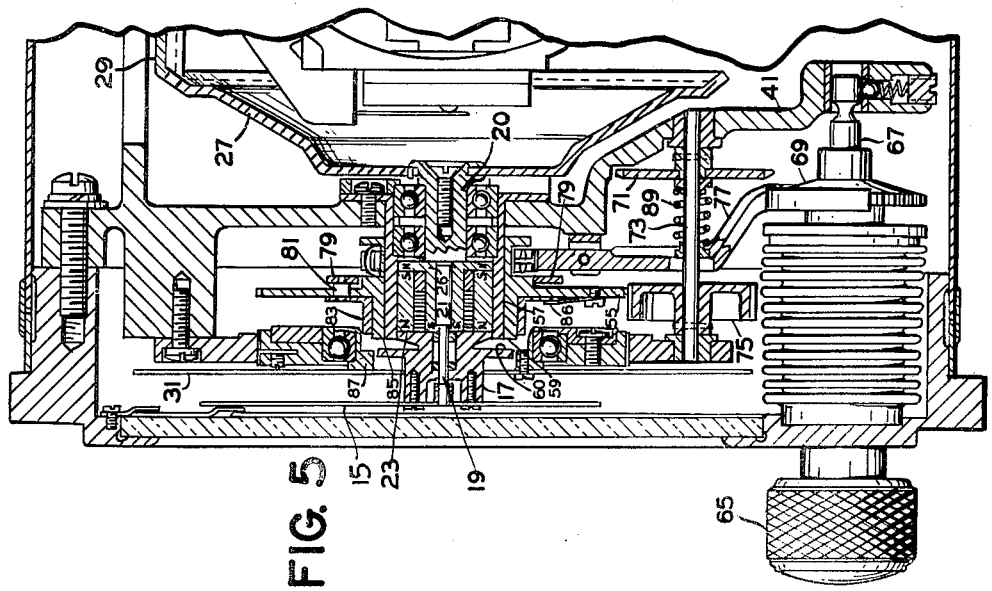
Figure 4:
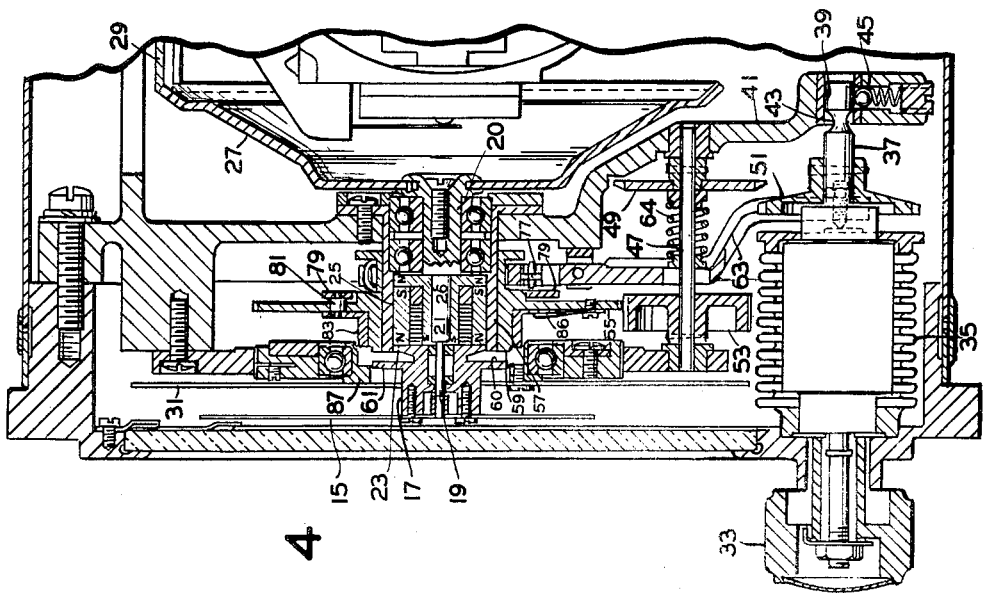

Figures 4 and 5 are detailed vertical sections drawn to enlarged scale and taken approximately on the lines 4—4 and 5—5, respectively, of Figure 2.

Figure 1:
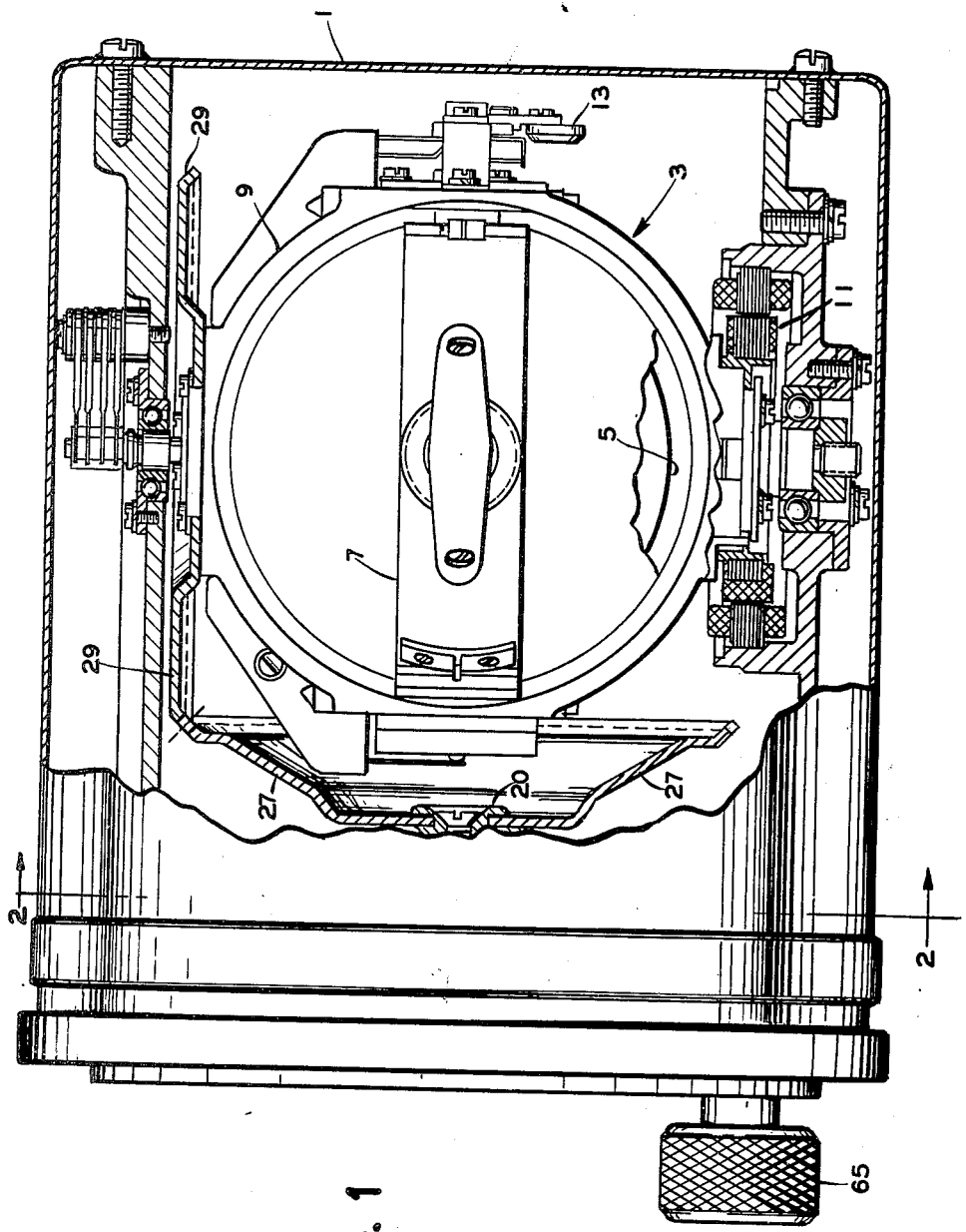
Fig. 1 is in part an elevation view and in part a vertical section of a directional gyroscope indicator constructed according to the invention.

Referring now to the drawings for a more detailed description of the novel directional gyroscope indicator of the present invention, the indicator is shown in Figure 1 as comprising a hermetically sealed housing 1 enclosing a three-degree-of-freedom gyroscope 3 comprising a rotor 5 supported by an inner gimbal 7 for rotation about a horizontal axis. An outer gimbal 9 mounts inner gimbal 7 for angular movement about an axis perpendicular to the spin axis and gimbal 9 is mounted for angular movement in housing 1 about an axis mutually perpendicular to the aforementioned axes. The spin axis is maintained horizontal by an erecting motor 11 controlled by a pendulum 13 operating a switch (not shown).

A pointer 15 is fixed to a hub 17 of magnetically permeable material (Figures 4 and 5) rotatable and movable axially on the outer end 19 of a shaft 21 rotatably mounted at its inner end 20 in housing 1. Pointer 15 and hub 17 are drivably connected to shaft 21 by a magnetic clutch 23 having a permanent magnet member 25 rotatable with shaft 21 and engaging hub 17. As indicated in Figure 4, the flux from the magnet passes through flanged collar 26 on shaft 21 engaging the magnet, through hub 17 and back to the magnet. A gear 27 is fixed to the inner end 20 of shaft 21 and drivably engages a gear 29 fixed to outer gimbal 9.

Figure 3:
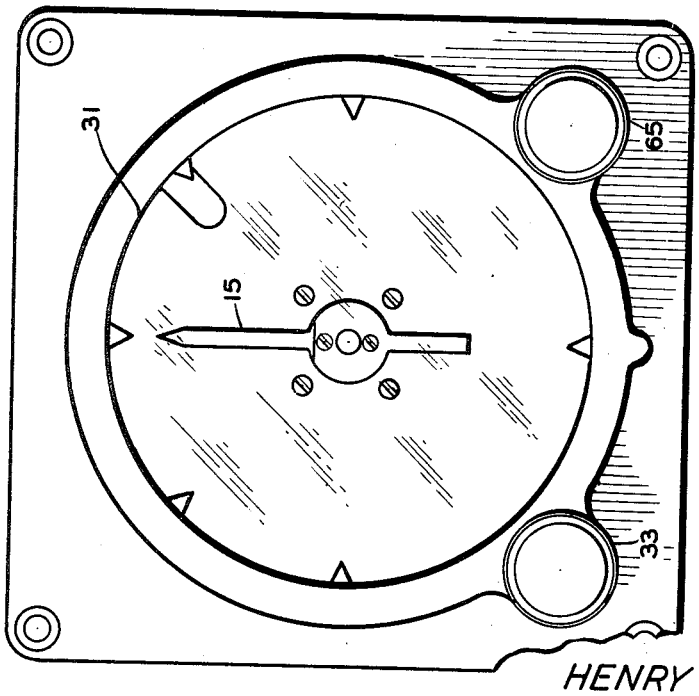
Figure 3 is a front view of the indicator.

When the craft in which the instrument is mounted executes a turn, the gyroscope remains stationary in space and housing 1 moves angularly about the gyroscope, whereby the pointer indicates the heading of the craft on a dial 31 (Figure 3) provided with compass graduations and supported by housing 1.

Due to the tendency of the gyroscope spin axis to wander in a horizontal plane because of bearing friction and other causes after the gyroscope operates for a prolonged period, pointer 15 may indicate on dial 31 a faulty heading of the craft, and it is necessary periodically to correct the reading of pointer 15. Magnetic clutch 23 provides for disconnecting the pointer from driving engagement with the gyroscope by separating hub 17 from magnet 25 to interrupt the flux path so that the pointer may be rotated relative to the gyroscope and without disturbing the gyroscope.

Pointer 15 may be relieved from driving engagement with the gyroscope by moving a knob 33 (Figures 3 and 4) axially inwardly of housing 1, and pointer 15 may be rotated relative to the gyroscope by rotating knob 33. Knob 33 is drivably connected through an airtight bellows arrangement 35 to a shaft 37 arranged for rotation and axial movement in a bearing 39 in a web 41 in housing 1. Shaft 37 has a detent 43 engageable by a spring-loaded ball 45 to hold the shaft and knob in adjusting position.

An idler shaft 47 is rotatably supported in housing 1 and at one end mounts a gear 49 arranged to mesh with a gear 51 pinned to shaft 37 and at its other end mounts a gear 53 meshing with a gear 55 rotatably supported for axial and rotating movement by a bearing 57 encircling magnet 25. When knob 33 is moved inwardly, gears 49, 51 mesh and when the knob is rotated, it rotates shaft 37, gear 51, gear 49, shaft 47, gear 53, and gear 55.

Gear 55 has a clutch surface 59 on its forward edge which cooperates with a clutch surface 60 on the rear face of a flange 61 on hub 17. Gear 55 is moved axially into engagement with hub 17 (Figures 2 and 4) by a shifting fork 63 pivotally supported by web 41. One end of the shifting fork engages gear 51 and the other end engages gear 55. When knob 33 is moved axially inwardly of the housing, shifting fork 63 moves gear 55 into engagement with hub 17 and the clutch faces provide a driving engagement therebetween so that rotation of knob 33 rotates pointer 15. A compression spring 64 seated at one end on shifting fork 63 and at its other end on gear 49 urges the shifting fork and gear 55 into retracted position whereby the pointer is drivably connected to the gyroscope.

In some instances it may be convenient to follow a set course when the pointer is in a predetermined position and the craft is on course. The pointer and dial, therefore, are movable together relative to the gyroscope without disturbing the gyroscope. To effect this adjustment a knob 65 (Figures 3 and 5) is moved axially inwardly of the housing to disengage pointer 15 from driving engagement with the gyroscope and the knob is rotated to adjust the pointer and dial.

The mechanism for effecting this adjustment (Figures 2 and 5) is substantially the same as that described for moving the pointer alone and comprises a shaft 67 supported for axial and rotatable movement by web 41 in housing 1. Shaft 67 has fixed thereto a gear 69 adapted to mesh with a gear 71 on one end of an idler shaft 73 mounting on its other end a gear 75 meshing with gear 55. A shifting fork 77 (Figures 2, 4, and 5) is pivoted on web 41 and at one end engages gear 69. The other end of the shifting fork engages a ring 79 slidable axially on gear 55 and engaging a pin 81 extending through an aperture in gear 55. A sleeve member 83 mounts pin 81 and is slidable on the hub 85 of gear 55 and is urged toward the gear by a flat spring 86. When knob 65 is moved axially inwardly of the housing, shifting fork 77 pivots and moves member 83 axially on the hub of gear 55 and then engages gear 55 and moves the gear and member together until they engage the hub 87 of dial 31 and the hub 17 of pointer 15, respectively. The outer edge of sleeve member 83 and the inner face of hub 87 have cooperating clutch faces so that the dial and pointer both are in driving engagement with gear 55. A compression spring 89 urges the shifting fork and gear 55 to retracted position and spring 86 urges member 83 to retracted position against gear 55.

The novel arrangement described provides a relatively simple mechanism for drivably connecting the pointer to the gyroscope and for disengaging the pointer from driving engagement with the gyroscope, and provides for adjustment of the pointer alone or the dial and pointer together without disturbing the gyroscope.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

I claim:

1. In an indicator of the class described, a shaft, a rotatable dial, a pointer rotatable relative to said dial, a clutch including a magnet drivably connecting said pointer to said shaft, a shifting fork for disengaging said pointer from its drivable connection to said shaft by separating said pointer from said magnet, and means for operating said shifting fork and for rotating said pointer and said dial together without disturbing said shaft.

2. In an indicator of the class described, a shaft, a rotatable dial, a pointer rotatable relative to said dial, a clutch including a permanent magnet drivably connecting said pointer to said shaft, manually operated means for adjusting said pointer alone or said pointer and said dial together relative to said shaft, means operated by said operating means for separating said pointer from said magnet to disengage said pointer from its driving connection to said shaft, and means drivably connecting said pointer alone to said manually operated means and for connecting said pointer and dial together to said manually operated means to adjust said pointer alone or said dial and said pointer together without disturbing said shaft.

3. In an indicator of the class described, a shaft, a rotatable dial, a pointer rotatable relative to said dial, a clutch including a magnet drivably connecting said pointer to said shaft, a pair of knobs, a pair of shifting forks actuated by said knobs for disengaging said pointer from its drivable connection to said shaft by separating said pointer from said magnet, means operated by said shifting forks and providing a driving connection between said pointer and said knobs, said means in addition providing a driving connection between said dial and one of said knobs so that upon operating said one knob said dial and said pointer together may be adjusted without disturbing said shaft and upon operating said other knob said pointer alone may be adjusted without disturbing said shaft.

References Cited in the file of this patent

UNITED STATES PATENTS

| Number | Name | Date |
|---|---|---|
| 2,334,116 | Meredith | Nov. 9, 1943 |
| 2,363,495 | Bates | Nov. 28, 1944 |
| 2,470,482 | Gabrielson | May 17, 1949 |
| 2,532,974 | Warner | Dec. 5, 1950 |

FOREIGN PATENTS

| Number | Country | Date |
|---|---|---|
| 522,207 | Great Britain | June 12, 1940 |